United States Patent [19]

St. Marie

[11] Patent Number: 5,472,011
[45] Date of Patent: Dec. 5, 1995

[54] NO SHUT-OFF REPAIR APPARATUS FOR STOP VALVES

[76] Inventor: Mark D. St. Marie, P.O. Box 5941, Lynnwood, Wash. 98046

[21] Appl. No.: 287,482

[22] Filed: Aug. 5, 1994

[51] Int. Cl.⁶ .................................................. F16K 43/00
[52] U.S. Cl. .................. 137/315; 29/213.1; 29/221.6; 137/319; 138/94
[58] Field of Search ............................ 137/15, 315, 317, 137/319, 321, 327, 328; 138/94, 97; 29/213.1, 221.6

[56] References Cited

U.S. PATENT DOCUMENTS

| | | | |
|---|---|---|---|
| 174,542 | 3/1876 | Letzkus | 137/318 |
| 561,620 | 6/1896 | Sharp | 137/318 |
| 571,077 | 11/1896 | Sheridan | 137/319 |
| 1,701,691 | 2/1929 | Mueller et al. | 137/318 |
| 1,833,700 | 11/1931 | Wolf | 138/94 |
| 2,151,594 | 3/1939 | Grantham | 137/318 |
| 2,187,838 | 1/1940 | Penick et al. | 137/319 |
| 2,780,244 | 2/1957 | Lee | 138/94 |
| 3,115,163 | 12/1963 | Van Epps et al. | 138/94 |
| 3,120,246 | 2/1964 | Alter | 138/94 |
| 3,626,576 | 12/1971 | Ray | 137/318 |
| 3,842,864 | 10/1974 | Riegel et al. | 138/94 |
| 4,127,141 | 11/1978 | Ledonne et al. | 137/321 |
| 4,184,504 | 1/1980 | Carmichael et al. | 138/94 |
| 4,239,055 | 12/1980 | Van Coffman | 138/94 |
| 4,647,073 | 3/1987 | Kosaka | 137/318 |
| 5,099,868 | 3/1992 | Weber | 138/94 |

FOREIGN PATENT DOCUMENTS

| | | | |
|---|---|---|---|
| 550605 | 12/1957 | Canada | 137/319 |
| 561796 | 8/1958 | Canada | 137/319 |
| 624457 | 7/1961 | Canada | 137/319 |
| 314797 | 9/1918 | Germany | 137/319 |
| 1500030 | 2/1969 | Germany | 137/315 |
| 3803813 | 8/1989 | Germany | 137/315 |
| 19440 | 8/1912 | United Kingdom | 137/319 |

Primary Examiner—George L. Walton
Attorney, Agent, or Firm—Robert W. Jenny

[57] ABSTRACT

The primary component of the apparatus is a full port ball valve. One port of the valve is adapted to attach to the bonnet threads of a stop valve. A tubular chamber is attached to the other port of the ball valve with the axes of the ball valve body and chamber aligned with the axis of the stop valve. A cylindrical probe fits through the chamber and open ball valve with a seal between the probe and the free end of the chamber. The inserted end of the probe is adapted to engage splines on a valve stem assembly of a stop valve. A rod extends through the probe and seals prevent leakage through the probe around the rod. The inserted end of the rod is adapted to engage the threads in the end of the stop valve stem assembly. Once the probe and rod are inserted and the splines and threads in the stop valve stem assembly are engaged, the probe is rotated to remove the stem assembly from the stop valve. The probe is then retracted so that the stem is in the chamber and the ball valve is closed. The probe with the stem assembly attached can then be removed for replacement or repair with minimal leakage from the apparatus. A stem can be reinstalled by the reverse of the removal process.

2 Claims, 1 Drawing Sheet

NO SHUT-OFF REPAIR APPARATUS FOR STOP VALVES

BACKGROUND OF THE INVENTION

1. Field

The subject invention is in the field of plumbing tools and repair apparatus. More specifically it is in the field of apparatus used in repairing valves, particularly a class of valves which have bonnets threaded onto the valve body around the valve stem. Valves known as stop valves are good examples of such valves and for purposes of this disclosure the term stop valve represents all valves having bonnets. Such valves are installed and used to shut off the water supply to a faucet to allow repair or replacement of the faucet.

2. Prior Art

There is no commercially available prior art to the subject invention known to the inventor of the subject invention. When it is necessary to repair a stop valve, conventional practice is to shut off water to the valve by shutting off the water supply to a complete building or segment of a building. Often the zone valves for such a shut-off are hard to find and such a shut off is a significant inconvenience to the occupants of the buildings and adds to the cost of the repairs. Accordingly, the prime objective of the subject invention is to provide apparatus which enables repairing a stop valve without shutting off the water supply to the valve. Other objectives are that the apparatus be economical to manufacture and easy to use.

SUMMARY OF THE INVENTION

The subject invention is apparatus for repairing a stop valve without shutting off the water supply to the stop valve. To use the subject apparatus the handle and bonnet of the valve are removed from the valve while keeping the valve closed; i.e. the stem securely tightened to hold the washer against the seat, and the apparatus is threaded onto the valve in place of the bonnet. The basic part of the apparatus is a full port ball valve which is in line with the stop valve stem when the apparatus is in use. There is a length of tubing between one port of the ball valve and the part which threads onto the valve instead of the bonnet. A second tube extends an appropriate distance from the other port of the ball valve. A closed end tube, called a probe for purposes of this disclosure, is provided which fits closely in the two tubes and particularly in the bore of the ball valve (when open). There is a seal at the end of the second tube between the second tube and the probe. The closed end of the probe is adapted to engage the splines on the valve stem. A rod extends through the probe and the end of the rod is adapted to engage the threads in the stem of the stop valve, threads which are normally engaged by the fastener which retains the handle on the stem. The probe and the rod are equipped with appropriate handles on their ends which are exposed when the apparatus is in place.

To repair the stop valve, the apparatus is installed on it by attaching the entire apparatus to the valve by the bonnet attach threads, engaging the stem splines by the end of the probe and engaging the stem handle attachment threads by the rod, and rotating the probe to remove the stem from the valve. This opens the valve but no water can escape from the apparatus. The probe, with the stem engaged and held in place by the rod, is pulled through the ball valve until the washer end of the stem is clear of the ball in the ball valve. No water can escape because of the seal between the probe and the tube on the second port of the ball valve. The ball valve is then closed and the probe can then be removed with the stem attached to be repaired or replaced and then reinstalled by reversing the removal process. If the seat of the stop valve needs replacing, a tool for that purpose can be installed on the probe and held in place by the rod and then inserted to engage the face for refinishing it. For this purpose it is important that the apparatus centerline be accurately coincident with the centerline of the stop valve.

The invention is described in more detail below with reference to the attached drawings.

DETAILED DESCRIPTION OF THE INVENTION

Figure 1:
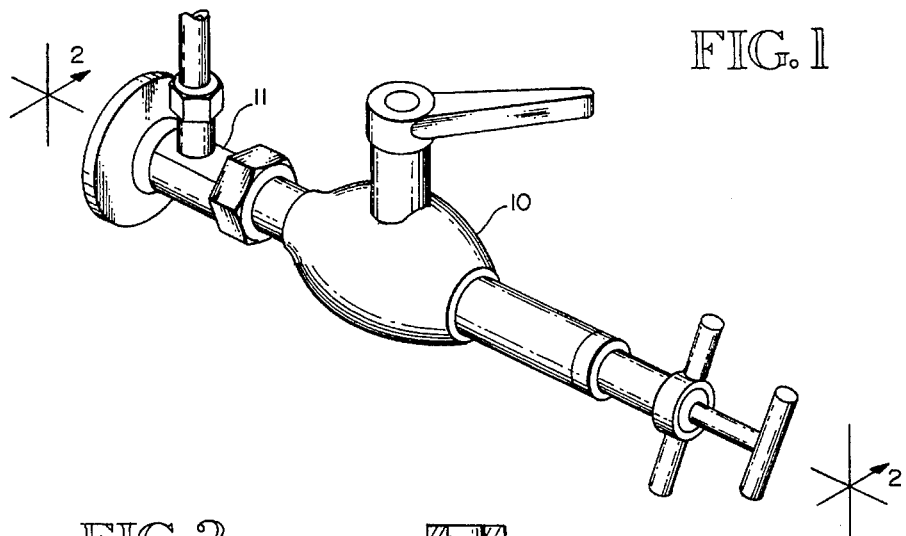
FIG. 1 is a general view of the subject apparatus installed on a stop valve.
Figure 2:
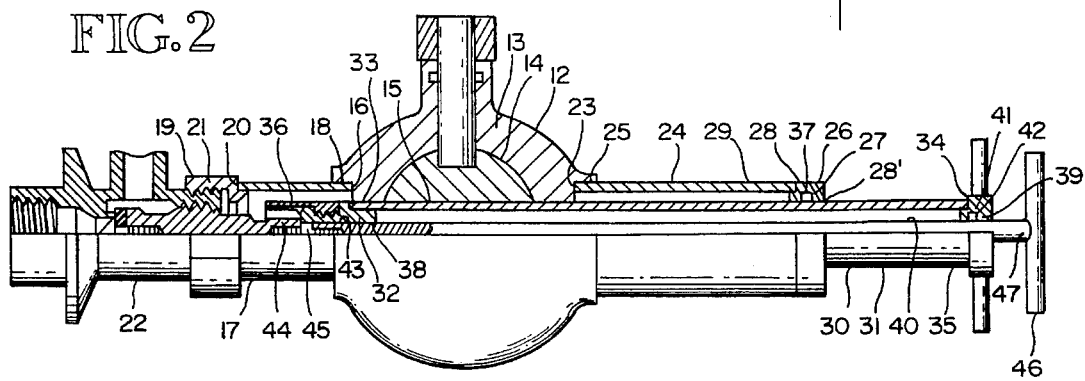
FIG. 2 is a sectional view taken at 2—2 in FIG. 1.

The subject invention is apparatus for repairing a stop valve without shutting off the water supply to the stop valve. FIG. 1 illustrates the apparatus 10 attached to stop valve 11 from which the handle and bonnet have been removed while the valve is closed and possibly leaking. FIG. 2 is a sectional view taken at 2—2 in FIG. 1. The primary component of the apparatus is a full port ball valve 12 comprising ball valve body 13 and ball 14 having through hole 15. End 16 of tube 17 is fastened into port 18 of the ball valve. Fitting 19 on end 20 of tube 17 is configured to thread onto threads 21 of body 22 of the stop valve, threads 21 being those normally engaged by the bonnet of the stop valve. The inside diameter of tube 17 is equal to or slightly larger than the diameter of hole 15. End 23 of tube 24 is fastened into port 25 of the ball valve. Fitting 26 with O ring seal groove 27 in its bore 28 is attached to end 29 of tube 24. Probe 30 comprises tube 31, fitting 32 attached to end 33 of tube 31 and fitting 34 attached to end 35 of tube 31. Fitting 34 may be configured to serve as a handle for rotating the probe about its long axis. It may also be configured to accept a wrench for that purpose or it may serve as both a wrench hold and a handle. Fitting 32 may be configured to fit the splines on the end of the stem of a particular brand or class of stop valves or it may be configured to hold any one of a plurality of adaptors, each adaptor being suited to a particular valve stem end configuration. Adaptor 36 is installed on fitting 32 in this example. O ring 37 in groove 27 prevents leakage through the gap $28^1$ between fitting 26 and the probe. Hole 38 in fitting 32 and hole 39 in fitting 34 accept rod 40 and O ring seal 41 in groove 42 prevents leakage through hole 39 around the rod. End 43 of the rod is configured either to engage the threads in end 44 of a particular class of valve stems or to hold any of a plurality of adaptors, each configured to suit a particular type, brand or class of valve stems. Adaptor 45 is attached to end 43 of the rod. Handle 46 is formed on end 47 of the rod.

Figure 3:
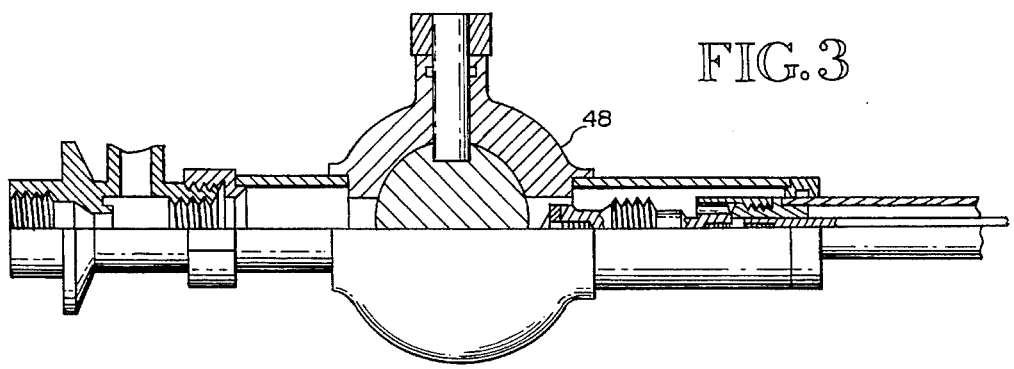
FIG. 3 is a sectional view similar to FIG. 2 but with the valve stem removed from the stop valve and positioned beyond the closed ball valve, ready for removal from the apparatus.

In this figure the apparatus is installed and ready for removal of the valve stem by rotation of the probe, the rod rotating with it. After the stem is unthreaded from the stop valve body the probe is moved to the position shown in FIG. 3 and the ball valve is closed as shown in FIG. 3 so that no water can escape when the probe with the stem attached is removed from the main assembly 48 of the apparatus. A new or repaired stem assembly can be installed by reversing the removal procedure.

If the seat of the stop valve is to be refinished, a refinishing tool is attached to fitting 34 on the probe, the probe is inserted part way into assembly 48 and the ball valve is opened to permit applying the refinishing tool to the seat. The refinishing tool attachment to the probe may incorporate a form of universal joint which allows the tool to adapt to the alignment of the seat, relieving requirements on the accuracy of the alignment of the apparatus with the stop valve body.

It is considered to be understandable from this description that the subject invention meets its objectives. It provides apparatus which enables repair of stop valves without shutting off the water supply to the stop valve by closing the related zone valve. Also, the apparatus is easy to use and is economical to manufacture.

It is also considered to be understood that while certain embodiments of the invention are disclosed herein, other embodiments and modifications of those disclosed are possible within the scope of the invention which is limited only by the attached claims.

I claim:

1. Repair apparatus for use with different types of stop valves connected to water under pressure, each of said types of stop valves comprising a valve body having bonnet threads thereon and one of a plurality of valve stem assemblies, each of said valve stem assemblies being removably secured in said body and having an end, one of a plurality of types of different splines on said end and one of a plurality of different types of threaded holes in said end, said apparatus comprising:

a full port ball valve having first and second ports, means for attaching said first port to said bonnet threads, a chamber having first and second chamber ends with said first chamber end attached to said second port, a probe having first and second probe ends and a first longitudinal axis and being insertable through said chamber and said ball valve to said end of said stem, said first probe end being adapted to engage said splines, said second probe end having means for rotating said probe, said apparatus further comprising a rod having a second longitudinal axis and first and second rod ends and being inserted through said probe with said first and second longitudinal axes coincident, said first rod end being adapted to engage said threads, said second rod end having means for rotating said rod, said apparatus further comprising sealing means between said probe and said second chamber end and between said probe and said rod, whereby when said splines and threads are engaged by said probe and said rod respectively, one of said stem assemblies can be removed without leakage of said water under pressure by rotating said probe to remove said stem assembly from said stop valve body, moving said probe with said stem assembly attached to position said stem assembly in said chamber, closing said ball valve and removing said probe from said chamber with said stem assembly attached, and further whereby a valve stem assembly can be reinstalled in said stop valve body by reversing the procedure for removing said valve stem assembly.

2. The apparatus of claim 1 further comprising means for adapting said apparatus to operate with valve stem assemblies having various combinations of said pluralities of types of splines and types of threaded holes.

\* \* \* \* \*